United States Patent Office 2,930,911
Patented Mar. 29, 1960

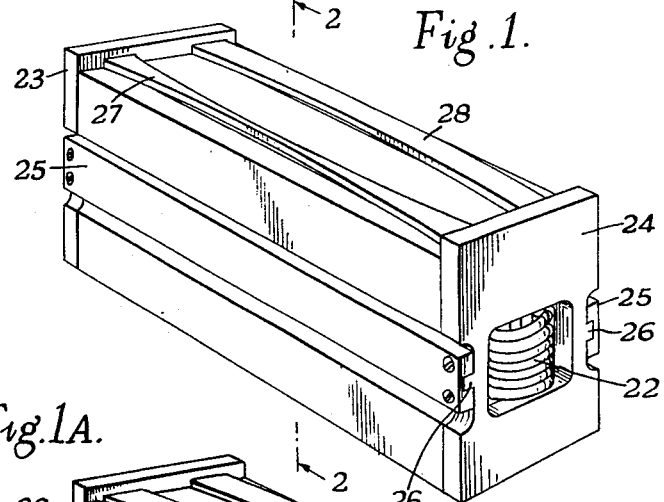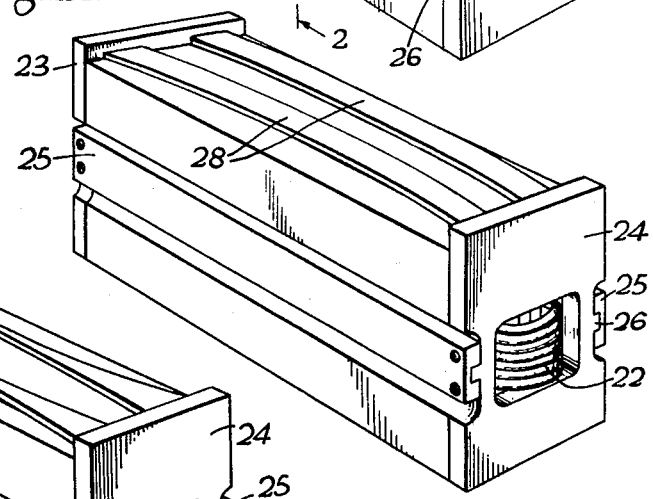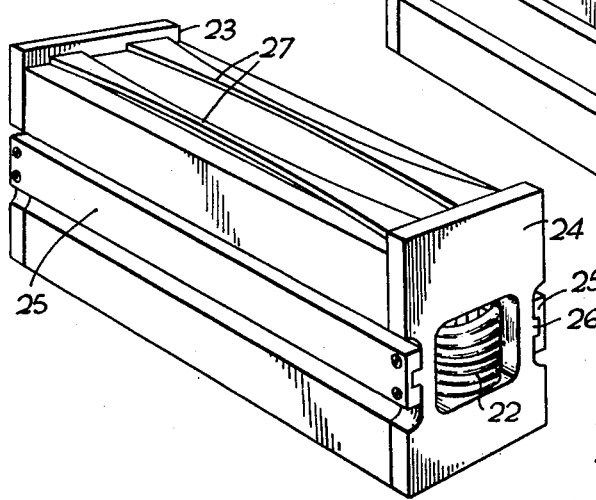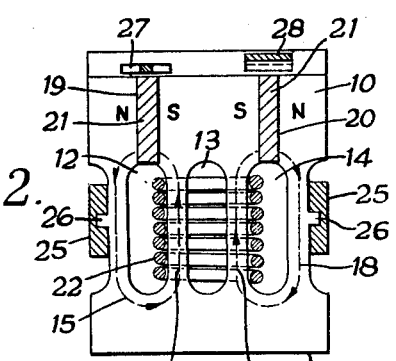

2,930,911

MAGNETOSTRICTIVE TRANSDUCERS

William Halliday and Frederick Peter Youell, Barkingside, England, assignors to Kelvin & Hughes Limited, Hillington, Glasgow, Scotland Application February 14, 1956, Serial No. 565,348

Claims priority, application Great Britain February 18, 1955

5 Claims. (Cl. 310—26)

The present invention relates to magnetostrictive transducers such as are used for converting electrical oscillations into mechanical vibrations and the reverse. Such transducers are used, for example, for echo-sounding.

In the case of electromagnetic waves, it is well known to use what is known as a "tapered" aerial array in order to modify the polar diagram of the radiation from the array. The modification may, for example, be to reduce or eliminate the secondary lobes. The tapering is usually effected by so designing the array that the amplitude of the oscillations decreases from the center outwards. Various relationships between the amplitude and the distance from the center have been employed, such as the gaussian taper and the binomial taper for example.

In applying this principle to magnetostrictive transducers radiating into water, the transducer has been divided into a large number of separate elements and each element has been excited differently according to the particular tapering law required. The difference in excitation has usually been effected by using different numbers of turns on the different elements. This has been found to have objections in practice because the number of turns on the center elements, namely those required to have the maximum amplitude of vibration, is generally small and consequently the number of steps of amplitude obtainable is severly limited. Moreover care has to be taken that stray coupling between elements does not interfere with the required tapering law which may be either gaussian or binomial, as mentioned above.

The invention has for its object to provide an improved magnetostrictive transducer in which the objections referred to are avoided.

According to the present invention a magnetostrictive transducer comprises a structure of magnetostrictive material, one or more permanent magnets for maintaining a polarizing flux in the structure and a winding adapted when traversed by an oscillatory current to vary the magnitude of the said flux and thereby to produce vibration of a face of the structure, the arrangement being such that the strength of the polarizing flux varies along one or more dimensions of the vibrating face of the structure. The polarizing flux may for example be arranged to be a maximum in the center and to decrease according to a desired law from the center outwards.

The electro-mechanical coupling depends upon the degree of polarization of the magnetostrictive material, such as nickel, and hence the mechanical amplitude can be varied by varying the degree of polarization.

The required variation in polarization may be produced by using along the structure a number of polarizing magnets of different strengths. Preferably, however, one or more magnets of uniform strength are used and either the cross sectional area of the magnetic material is varied or one or more magnetic shunts of varying reluctance are employed along the structure.

The magnet or magnets are preferably of the ceramic type, that is to say they are composed of sintered powdered magnetic material, usually ferrites. Such magnets are non-conducting and are not therefore subject to eddy currents. They can conveniently be arranged to be traversed by the A.C. flux.

The invention will be described, by way of example, with reference to the accompanying drawing in which Fig. 1 is a perspective view of a transducer according to the invention, Figs. 1A and 1B illustrate respectively different embodiments of the transducer according to the present invention, and Fig. 2 is a view in section on the line 2—2 of Fig. 1.

Referring to the drawings, the magnetic circuit of the transducer is built up of nickel laminations 10 of the shape shown in Fig. 2 having an edge 11 which will be called the radiating edge because it lies in the radiating face of the transducer. The lamination has three apertures 12, 13 and 14 elongated in a direction perpendicular to the edge 11, thus forming four limbs 15, 16, 17 and 18 of approximately equal width and of the same length in the said direction. Slots 19 and 20 are cut between the edge of the lamination opposite to the radiating edge 11 extending into the two outer apertures 12 and 14.

A large number of these laminations is assembled to form an elongated structure and an elongated ceramic bar magnet 21 of rectangular cross-section is arranged in each of the slots 19 and 20. The magnets are arranged with like poles facing one another so that each drives flux into one face of the slot 19 or 20, through one limb 15 or 18, around the end of one aperture 12 or 14, through the limb 16 or 17 and back to the opposite face of the slot. Thus the flux in the two central limbs 16 and 17 is in the same direction. A winding 22 is provided in the two outer apertures thus embracing the two central limbs 16 and 17.

A stack of laminae is clamped between two end cheeks 23 and 24 which are held together by side straps 25 each having a slot in which engages a rib 26 projecting from the limbs 15 and 18 and end cheeks 23 and 24.

Two different forms of magnetic shunt are shown associated with the two slots 19 and 20 in the embodiment of Fig. 1 in order to provide tapering, although it will of course be understood that usually the same form of shunt will be employed, for convenience, in association with each slot. Thus, in Fig. 1A, both of the magnetic shunts employed are the same as the shunt 28 of Fig. 1. Similarly, in Fig. 1B, both of the magnetic shunts employed are similar to the shunt 27 of Fig. 1.

Thus over the end of the slot 19 is a strip 27 of magnetic material having a cross-section which is a minimum at its center and increases toward both ends. The reluctance of this slot is thus a minimum, and the shunting effect is a maximum, near the two ends.

Over the end of the slot 20 there is fixed a strip 28 of magnetic material of uniform cross-section, this strip being bowed in such a manner that its spacing from the laminations is greatest at the center. In this case also, therefore, the shunting effect is a maximum near the two ends.

The variation in cross-section of the strip 27 and of spacing of the strip 28 may be in accordance with any desired law. The effect of the tapered shunts is to vary the polarization of the core and hence the coupling factor, along the length of the core (that is in a direction perpendicular to the planes of the laminae). In this way the amplitude of vibration of the face 11 is arranged to vary over the length of the transducer.

In the example illustrated, the length of the transducer is 6 inches and the drawing is approximately to scale.

Instead of using tapered shunts, as described, the strengths of the magnets 21 may be arranged to vary along the length of the structure, for instance by using a number of discrete magnets of differing strengths instead of each of the magnets 21, or by using magnets 21 of a cross-section which varies along their length.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

An example of the above would be obvious to one skilled in the art after an inspection of Figure 2 which is a double arrangement using two permanent magnets. Figure 2 could be split down the middle with the coil 22, for example, surrounding only the limbs 16 or 17 as the case may be. That is, while the structure of Figure 2 would be split down a vertical center line, the coil 22 would, of course, have to be a complete coil. This arrangement would work quite satisfactorily although it would not be symmetrical nor would it represent a preferred design. Such a structure, however, would clearly fall within the spirit of the present invention and is intended to be covered by the appended claims.

We claim:

1. A magnetostrictive transducer comprising a structure of magnetostrictive material, at least one permanent magnet for maintaining a polarizing flux in the structure, a coil positioned to be traversed by said flux to vary the magnitude of the said flux, and thereby to produce vibration of a face of the structure, and means varying the strength of said polarizing flux traversing said coil along at least one dimension of the cross-section of said coil and along at least one dimension of said face.

2. A magnetostrictive transducer comprising a structure of magnetostrictive material, at least one permanent magnet for maintaining a polarizing flux in the structure, a winding positioned to vary the magnitude of the said flux and thereby to produce vibration of a face of the structure, and magnetic shunting means positioned to vary the strength of said polarizing flux along at least one dimension of said face.

3. A magnetostrictive transducer comprising a structure of magnetostrictive material, at least one permanent magnet for maintaining a polarizing flux in the structure, a coil positioned to vary the magnitude of the said flux and thereby to produce vibration of a face of the structure, and a member of magnetic material of cross-section varying along its length positioned to shunt a portion of the polarizing flux between the poles of said magnet, said portion varying along the length of said member in dependence upon the cross-section of said member.

4. A magnetostrictive transducer comprising a structure of magnetostrictive material, at least one permanent magnet for maintaining a polarizing flux in the structure, a coil positioned to vary the magnitude of the said flux and thereby to produce vibration of a face of the structure, and a member of magnetic material at a distance from said magnet varying along the length of said member and positioned to shunt a portion of the polarizing flux between the poles of said magnet, said portion varying along the length of said member in dependence upon the said varying distance.

5. In combination in a magnetostrictive transducer, a body member of magnetostrictive material, means for maintaining a polarizing flux in at least a portion of said body member, means to vary the effective magnitude of said flux to produce vibration of at least said polarized portion of said body member, and means for varying the effective strength of said polarizing flux along at least one dimension of said polarized portion of said body member.

References Cited in the file of this patent

UNITED STATES PATENTS

| | | |
|---|---|---|
| 2,391,678 | Bundy | Dec. 25, 1945 |
| 2,411,911 | Turner | Dec. 3, 1946 |
| 2,437,270 | Peek | Mar. 9, 1948 |
| 2,745,084 | Bundy | May 8, 1956 |